(No Model.) 2 Sheets—Sheet 1.
M. WADDELL.
SYSTEM OF ELECTRIC DISTRIBUTION.
No. 374,381. Patented Dec. 6, 1887.
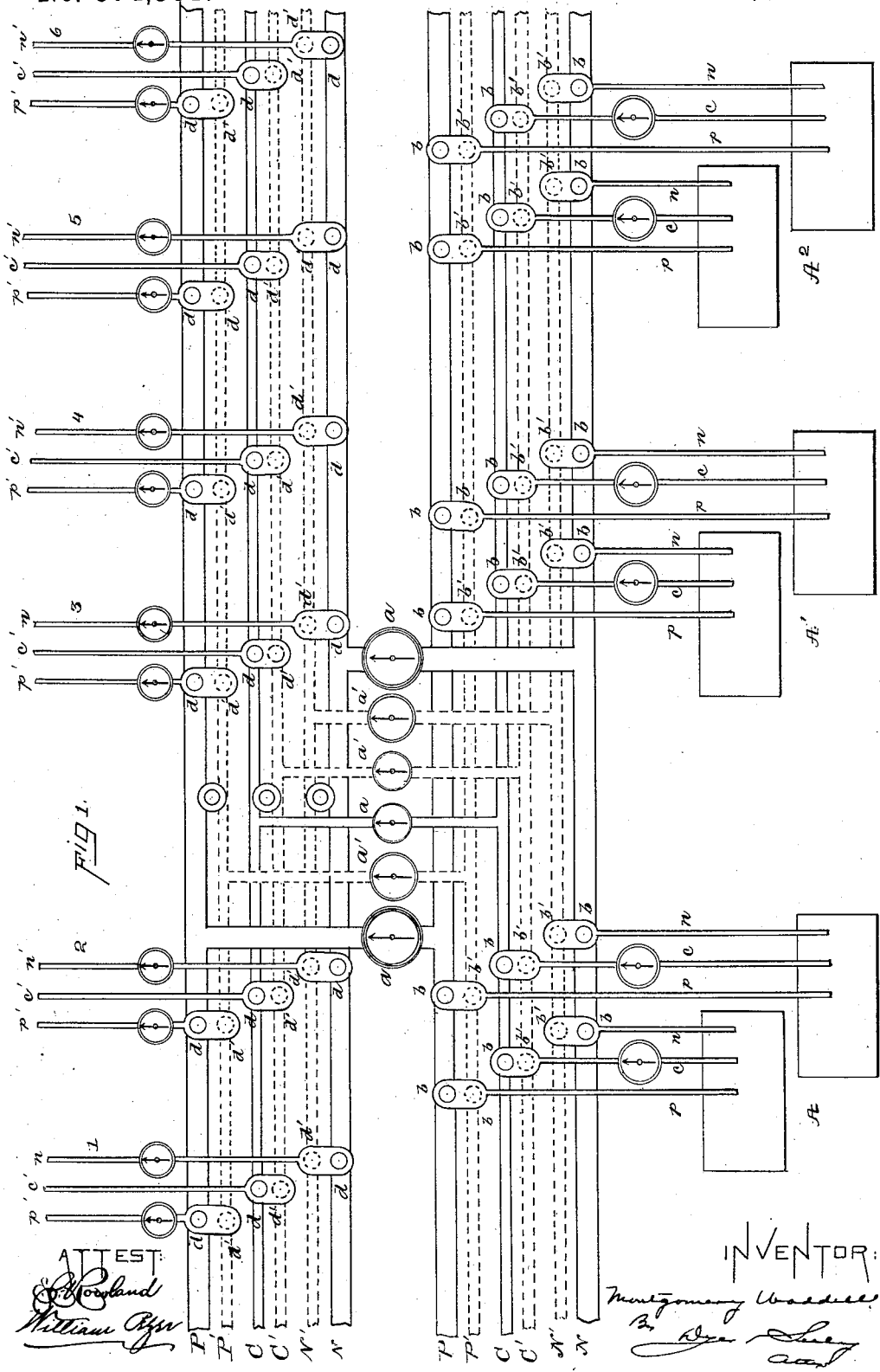

(No Model.) 2 Sheets—Sheet 2.
M. WADDELL.
SYSTEM OF ELECTRIC DISTRIBUTION.
No. 374,381. Patented Dec. 6, 1887.
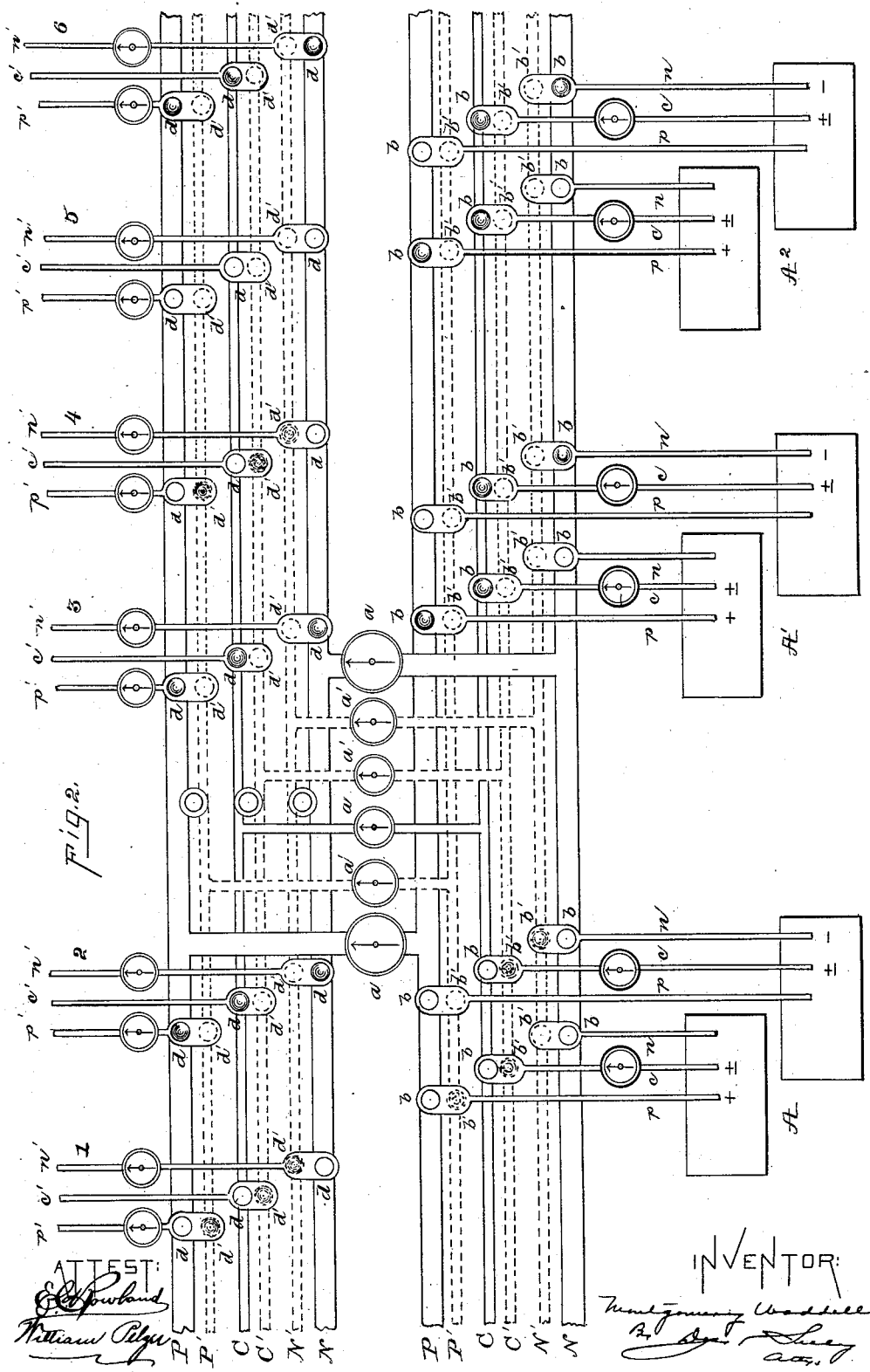

UNITED STATES PATENT OFFICE.

MONTGOMERY WADDELL, OF NEW YORK, N. Y.

SYSTEM OF ELECTRIC DISTRIBUTION.

SPECIFICATION forming part of Letters Patent No. 374,381, dated December 6, 1887.

Application filed July 2, 1887. Serial No. 243,219. (No model.)

*To all whom it may concern:*

Be it known that I, MONTGOMERY WADDELL, a subject of the Queen of Great Britain, residing at New York, in the county and State of New York, have invented a certain new and useful Improvement in Systems of Electrical Distribution, of which the following is a specification.

My invention relates to the Edison system of electric lighting in which several dynamo-electric machines are connected to common or omnibus conductors at the central station, from which feeding-circuits extend to a system of intersecting and connected main or lighting conductors from which the house-circuits supplying lamps in multiple arc are derived.

The invention is applicable to either the three-wire multiple-series system or a two-wire multiple-arc system, or to any system employing omnibus conductors.

In systems such as thus generally described difficulty sometimes arises from the occurring of leaks, crosses, or ground-connections in various conductors, which it is necessary to locate and repair, as otherwise they may injure the system by blowing out the safety-catches, or by the waste of current due to leakage to the earth between the different sides of the system. In order to locate and repair a leak, it has been necessary to sever the connections of conductors in that part of the system whereby the supply of current to the translating devices is interrupted.

The object of my invention is to enable such faults in the system to be more readily located and to diminish the liability of injury to the system thereby.

To this end my invention consists, mainly, in providing at the central station a duplicate or supplementary set of omnibus conductors and suitable switches, whereby any one or more feeding-circuits can be readily connected to the supplementary set, instead of to the regular set, and any one or more of the dynamo-circuits may also be so connected, whereby the system may be divided and any part in which a fault occurs may be run from a separate dynamo or section of dynamos from the rest of the system, so that the current of the whole system will not be affected and the safety-fuses of all the conductors will not be endangered, and the feeders may be readily disconnected, one at a time, to determine in what part of the system is the leak or other fault.

My invention is illustrated in the accompanying drawings, in which—

Figure 1 is a diagram of the conductors at a central station according to my invention, and Fig. 2 a diagram of the same system divided by the manipulation of the switches.

The full lines represent an arrangement of conductors in a three-wire Edison central station.

A, A', and $A^2$ represent each a pair or set of dynamo-electric machines, which forms a divided source having positive, negative, and neutral terminals, as indicated, from which extend, respectively, the positive, negative, and neutral or compensating dynamo-conductors $p$, $n$, and $c$. While each dynamo has three conductors extending from it, the positive of one and the negative of the other are not normally in use, so that the two are in series and form together a unit of the source of supply.

P, N, and C are the omnibus conductors, which are of copper, and each of which is made in two parts, joined by a cross-connection, in each of which cross-connections is interposed an amperometer, $a$, whereby the whole current on the omnibus wires is indicated. The dynamo-conductors are arranged to be connected with the omnibus wires through plug-switches at $b\ b$, or any other suitable switches. The positive, negative, and compensating conductors $p'$, $n'$, and $c'$ of the feeding-circuits extend from the like conductors of the omnibus system, plug-switches $d$ or other switches being provided for connecting and disconnecting them.

The supplementary set of omnibus wires P', N', and C' are shown in dotted lines. They are arranged similarly to the regular set, being each in two parts joined by cross-conductors, including ampère-indicators $a'\ a'$. Plugs or other switches are provided at $b'\ b'$ for the dynamo-conductors, and at $d'\ d'$ for the feeding-conductors, whereby these may be connected to the supplementary set instead of to the regular set. By this means—that is, by withdrawing some plugs and inserting others— any feeding circuit or circuits may be fed from any dynamo or dynamos, and thus a part of the system in which a leak occurs may be disconnected from the rest of the system, and the rest of the system will therefore not be affected by such fault.

Fig. 1 shows all the central-station circuits, but with no connections made, or, if all the plugs are supposed to be in, with the system running normally, I may have all the plugs of both sets in when running normally, so that the supplementary conductors will assist the others to carry the whole current. It is therefore unnecessary to increase the whole amount of copper required for the omnibus wires in order to practice my invention.

Fig. 2 shows the system divided, and if the proper disconnections have been made in the outside or lighting system there will be no electrical connection between the two parts or sub-systems. It can then be easily determined in which sub-system the fault has arisen. Or the figure may indicate a case in which it is desired to run two feeders for a time independently of the rest of the system—for instance, if there are two grounds on the system and they have been separated one onto each sub-system. It will be seen that the plugs are so placed that generators A are supplying feeders Nos. 1 and 4 while generators A' and A² are supplying feeders Nos. 2, 3, and 6, feeder No. 5 not being in use at present. This feeder may be connected to either omnibus system by the insertion of the right plugs at $d$ or $d'$, and any feeder or any dynamo may be changed from one part of the system to the other in the same way. The amperometers $a\ a$ and $a'\ a'$ show what current is being taken by each sub-system, and the feeder-indicators show the current taken by each individual feeder.

The system may be divided without any change in the steadiness of the currents flowing, in the following way: If the system is running normally, and it is desired to have one pair of dynamos supply two feeders separately, insert the plugs $d'\ d'$ of those feeders and the plugs $b'\ b'$ of that dynamo pair, (if these are not already in,) and then withdraw the plugs $d\ d$ of the feeder-circuits. Then increase or decrease the current on the positive side of the pair of dynamos until it equals the sum of the currents on the positive sides of the two feeders to be supplied, and then withdraw the positive plugs $b$ of the dynamo. Do the same with the negative currents and draw the negative plugs of the dynamo. Since when the plugs were removed there was no difference of potential thereat, there will be no variation of current. The system may thus be separated, throwing off one section after another until one that is faulty is found, and this one can be run by itself and not affect the rest of the system.

Instead of one set of supplementary conductors I may have two or more sets, whereby the system may be further subdivided. Ordinarily, however, the duplication of the conductors will be sufficient.

While I have shown my invention in connection with a three-wire system, it is evidently adapted as well to a two-wire multiple-arc system.

What I claim is—

1. In a system of electrical distribution, the combination of two or more generators, omnibus conductors to which such generators are separately connected, feeding-circuits extending from said omnibus conductors, a supplementary set of omnibus conductors, and switches for connecting each feeding-circuit with either the main set or the supplementary set of omnibus conductors, substantially as set forth.

2. In a system of electrical distribution, the combination of two or more generators, omnibus conductors to which such generators are separately connected, feeding-circuits extending from said omnibus conductors, a supplementary set of omnibus conductors, and switches for connecting each generator-circuit with either the main set or the supplementary set of omnibus conductors, substantially as set forth.

3. In a system of electrical distribution, the combination of two or more generators, omnibus conductors to which such generators are separately connected, feeding-circuits extending from said omnibus conductors, a supplementary set of omnibus conductors, switches for connecting each feeding-circuit with either the main set or the supplementary set of omnibus conductors, and switches for connecting each generator-circuit with either the main set or the supplementary set of omnibus conductors, substantially as set forth.

4. In a system of electrical distribution, the combination of the ordinary omnibus conductors and the supplementary omnibus conductors, each conductor of each set being divided into two parts, and such parts being connected through ampère-indicators, substantially as set forth.

This specification signed and witnessed this 28th day of June, 1887.

MONTGOMERY WADDELL.

Witnesses:
FRED JOHNSON,
E. E. WINTERS.